Dec. 22, 1970  D. H. KOHN ET AL  3,549,731
METHOD FOR THE PRODUCTION OF RESIN PARTICLES
Filed May 6, 1968  3 Sheets-Sheet 1
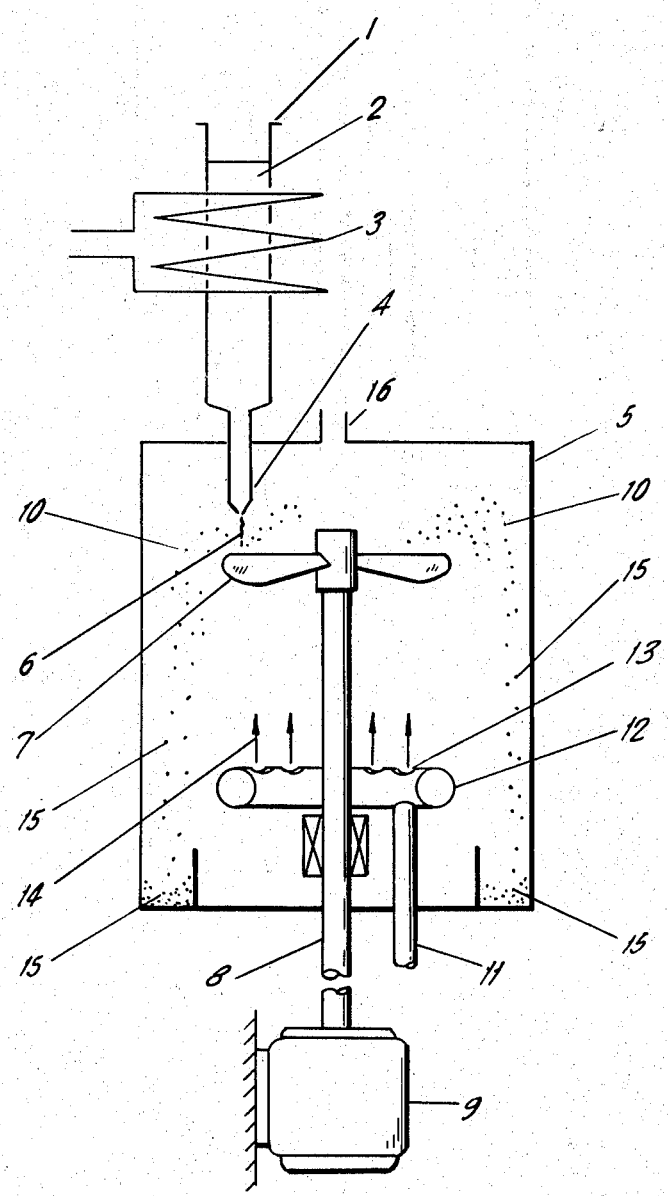
INVENTORS
DAVID HARRY KOHN
MOSHE NARKIS
BY JACOB WEITZMAN
WALTER NEUMANN
OSTROLENK, FABER, GERB & SOFFEN
ATTORNEYS Dec. 22, 1970   D. H. KOHN ET AL   3,549,731
METHOD FOR THE PRODUCTION OF RESIN PARTICLES
Filed May 6, 1968   3 Sheets-Sheet 2
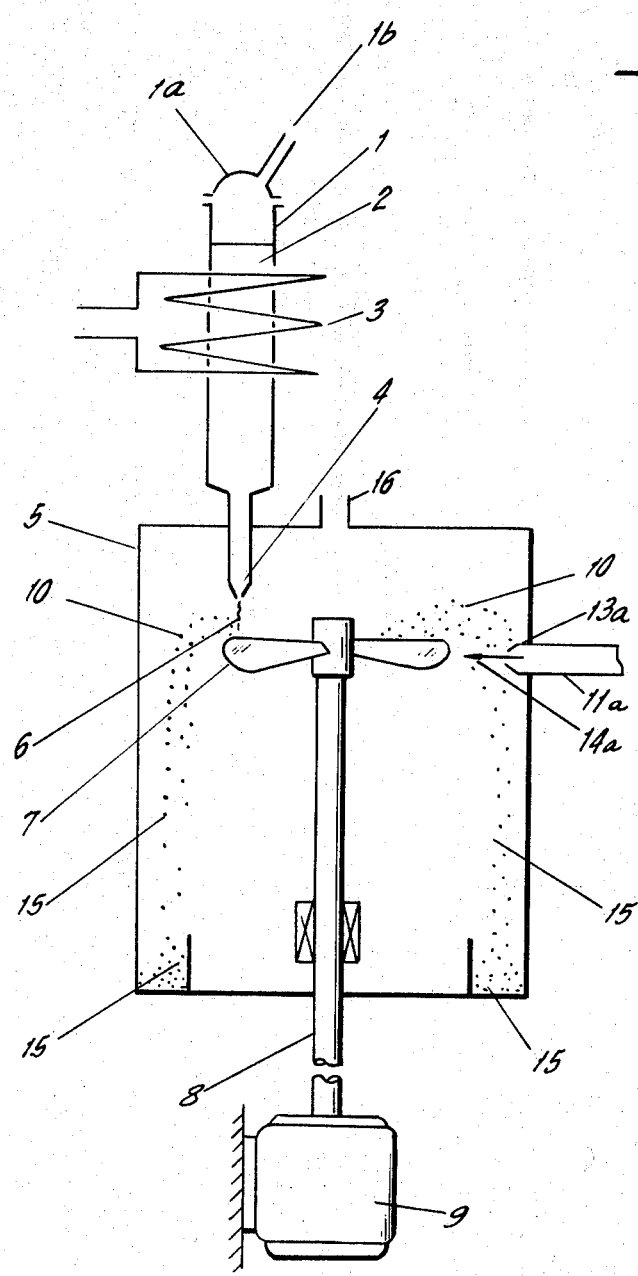
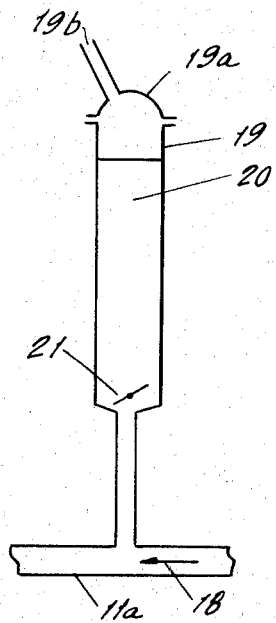
INVENTORS
DAVID HARRY KOHN
MOSHE NARKIS
BY JACOB WEITZMAN
WALTER NEUMANN
OSTROLENK, FABER, GERB & SOFFEN
ATTORNEYS

# United States Patent Office 3,549,731
Patented Dec. 22, 1970

3,549,731
METHOD FOR THE PRODUCTION OF RESIN PARTICLES
David Harry Kohn, Moshe Narkis, and Jacob Weitzman, Haifa, and Walter Neumann, Nahariya, Israel, assignors to Technion Research and Development Foundation Limited, Technion City, Haifa, Israel
Filed May 6, 1968, Ser. No. 726,869
Claims priority, application Israel, May 9, 1967, 27,947
Int. Cl. B29c 23/00
U.S. Cl. 264—8
7 Claims

ABSTRACT OF THE DISCLOSURE

Hot viscous resin is converted into discrete hardened particles by flowing the viscous resin over an item which disperses the resin into particles and passing a cool hardening gas over the viscous particles so formed to harden same. In one embodiment, the particles are dispersed by a rotating mechanical member and the hardening gas flows sideways across the mechanical member and across the flow of viscous resin. In another embodiment the particles are dispersed by a flow of gas under pressure.

THE FIELD OF THE INVENTION

Conversion of bulk resin into discrete handleable particles.

DESCRIPTION OF THE PRIOR ART

Heretofore it has been common practice to produce a molding resin such as phenol-formaldehyde resins known as "Novolac" in the reaction kettle and to run the hot viscous resin either into a shallow pan or onto a concrete floor where it is permitted to cool and harden. This hardened resin is then broken up by hand and crushed and ground by suitable mechanical equipment to a fine powder. This is a cumbersome and expensive procedure as well as involving the necessity for safety precautions, especially where the resin is run onto a concrete floor. The following references show that this is the conventional procedure in the field.

David F. Gould, Phenolic Resins, Reinhold Publishing Corporation, New York, 1959; p. 38.

Charles C. Winding and Gordon D. Hiatt, Polymeric Materials, McGraw-Hill Book Company, Inc., New York, 1961; p. 224.

Flow-sheet for Phenol-Formaldehyde Moulding Powder, ibid, p. 225.

P. H. Groggins, Unit Processes in Organic Synthesis, McGraw-Hill Book Company, Inc., New York, 5th edition, 1958; p. 949.

F. E. Reese and Ely Perry, Ind. Eng. Chem., vol. 40; p. 2044 (1948).

R. E. Kirk and D. F. Othmer, Encyclopedia of Chemical Technology, The Interscience Encyclopedia, Inc., New York, vol. 10, p. 346–347.

The advantage of the method disclosed herein is that the resin is converted directly into a physical form suitable either for shipping or use in molding machines or the like without any of the hazards and inconveniences associated with the prior art method.

SUMMARY OF THE INVENTION

In the process of the present invention there is provided a means of converting bulk fluid resins such as phenol-formaldehyde, coumarone-indene, rosin, asphalt, polyethyleneglycol and the like into small handleable form such as granules, powders or the like. It is a further feature of the process that it allows for the admixture into the granules of fillers such as are conventionally used in the molding art, for example wood, flour and the like.

The basis of the method comprises introducing a flow of molten resin into the apparatus and atomizing the flow either by mechanical or gas stream means into small discrete particles which are then rapidly cooled by a gas stream at a temperature substantially lower than the resin temperature flowing through the apparatus in such a manner that when the particles have descended to the bottom of the apparatus they are sufficiently hardened so that they will not stick together and will readily flow out of the bottom of the apparatus.

There are numerous possible variations of the process described and claimed herein. In one variation the resin flows downward into the apparatus and impinges upon propellers in a substantially horizontal plane rotating about a vertical axis. It has been found that by varying the pitch of the propellers, variations in size of the particles may be effected. In this modification the hardening gas stream travels substantially vertically upwards from below the propeller. In another modification the hardening gas stream instead of coming from below is injected from the side substantially at the level of the propeller blades. In yet another modification the cooling gas stream may carry with it particles of filler such as wood flour or the like which are then intimately admixed with the resin in the process.

In the other major variation of the process the atomization is effected by directing the flow of the resin in a substantially horizontal direction where it impinges upon a downwardly directed high velocity gas stream which serves the dual function of atomization and hardening. If desired, however, the hardening may be augmented by an upwardly flowing gas stream additional to the downwardly flowing atomization stream. Similarly in this variation fillers such as wood flour or the like may also be added in a similar manner.

The method of the invention, and the apparatus for accomplishing the same is described in the following four figures in which:

FIG. 1 is a cross-sectional view of the apparatus in which molten resin is dispersed mechanically and the hardening gas stream comes from below.

FIG. 2 is a cross-sectional view of the apparatus in which the molten resin is also dispersed mechanically and the hardening gas stream comes from the side.

FIG. 3 is a cross-sectional view of a portion of the apparatus in which another ingredient is introduced from the side along with the hardening gas, as shown in FIG. 2.

Figure 4:
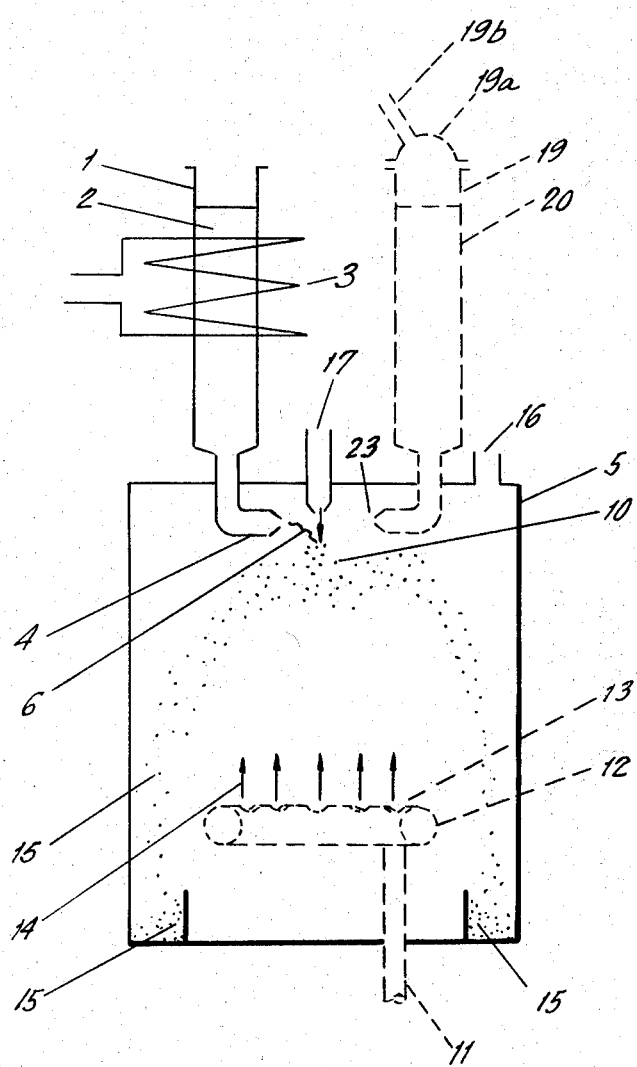
FIG. 4 is a cross-sectional view of the apparatus in which molten resin is dispersed through atomizing action and optionally another ingredient is introduced concurrently and a further optional hardening gas stream comes from below.

The process of the invention in its preferred embodiments will be described in greater detail hereinbelow.

PREFERRED EMBODIMENTS

In the preferred embodiments of the present invention the resin to be atomized is brought to the molten state in the resin reservoir. Any resin or plastic which may be reduced to the molten or substantially molten state may be utilized in this process. Among the suitable resins are phenol-formaldehyde, coumarone-indene, rosin, asphalt, polyethyleneglycol, and the like.

Depending upon its nature, the resin is heated to a temperature moderately above its melting point. Thus, the temperature may vary from about 65° C. through about 200° C. In certain cases it is desirable, for speed of operation, to place the resin reservoir under slight excess pressure, for example from about 1 to about 15 p.s.i.

In the modification which utilizes a propeller as the atomizing agent, the molten resin impinges upon the propeller which has a pitch relative to the stream of resin of between 15° and 80° and is rotated at an angular velocity of from about 1000 to about 2000 r.p.m.

Although it has been found cheap and convenient to utilize air at ambient temperature as the cooling and hardening gas it can be foreseen that under certain circumstances it would be desirable to reduce the possibility of oxidation of the resin. Hence, any relatively inert gas such as nitrogen, carbon dioxide, or the like could be substituted. If desired, the hardening gas may be cooled below ambient temperature.

While it is preferred to atomize the particles utilizing a propeller other modifications are feasible and are to be considered to be within the purview of the present invention. These include the force of impingement upon the resin stream of a high velocity gas stream, and the break-up energy derived from a vibrating mechanical member. The vibration may be initiated by high frequency sonic or ultrasonic energy.

The process of the present invention is uniquely suited for the in situ compounding of resins with other components of molding powders. Thus, in one variation of the process the other components of the molding composition, for example wood flour, hexamethylenetetramine, calcium oxide, zinc stearate, and the like are blown into the apparatus so as to impinge upon the molten resin before it hardens thus yielding integral ready-mixed particles of molding powder. In the process of the present invention the size of the particles obtained may be varied by varying the conditions of dispersion. Thus, there may be obtained pellets ranging from about 5 millimeters of diameter down to particles of about 1 millimeter in diameter as well as moderately fine powders.

The apparatus utilized may be described in detail as follows:

According to the apparatus of FIG. 1, resin reservoir 1 is used to contain the molten resin 2 which is heated by heating element 3 (electric resistance coil, or steam coil, for example). The molten resin flows out of the resin outlet tube 4 into the spray hardening vessel 5 so that the molten resin stream 6 impinges against the rotating blades of propeller 7 contained inside the spray hardening vessel 5. The propeller 7 is driven by shaft 8 which itself is driven by a powered rotating means 9. As a result of the contact between the molten resin stream 6 and the rotating propeller 7 many molten resin particles 10 are produced, and these are thrown off laterally and fall under the action of gravity. Hardening gas is supplied to the apparatus through gas inlet tube 11 which conveys it to gas distributing ring 12. The hardening gas flows through the distributing ring 12 and comes out through the hardening gas outlets 13 so that the incoming hardening gas 14 is formed into a series of vertical uprising jets. These jets mix with the downcoming stream of molten resin particles 10, and the result is that cooled and hardened resin particles 15 are formed. These hardened resin particles 15 then fall to the bottom of the spray hardening vessel 5 where they are collected. A vent or outlet opening 16 is provided at the top of the spray hardening vessel 5 to vent the excess hardening gas.

The apparatus of FIG. 2 is similar to the apparatus of FIG. 1 with the following exceptions: First of all, for certain very viscous resins, it may be necessary to introduce the molten resin 2 under pressure. In FIG. 2, a cover 1a has been attached to the resin reservoir 1, and air (or other gas) under pressure is introduced through tube 1b above the molten resin 2 in order to force the latter out and into the spray hardening vessel 5. The second difference is that hardening gas is introduced through the gas inlet tube 11a and the hardening gas outlet 13a with the gas inlet tube 11a placed in the side of the spray hardening vessel 5 substantially in the plane of the rotating propeller 7. The incoming hardening gas jet 14a is further positioned so that the jet is substantially tangent to the periphery of the propeller tip circle. The hardening gas jet 14a mixes with the molten resin particles 10, and the result is that cooled and hardened resin particles are formed. Note that when it is required for special resins (those having a high specific heat) the gas distribution ring 12 of FIG. 1 can also be added to the apparatus of FIG. 2. In this case, hardening gas 14 is supplied both from below and from the side.

The embodiment of FIG. 3 of the invention discloses an additional portion of the apparatus utilized where it is desired to add to the resin some other ingredient, either liquid or solid. For example, the additive could be a solid, particulate filler, such as wood flour, pigment(s), and mineral fillers; or, the additive could be a hardener, dye, lubricant, or any other liquid or solid compatible with the resin. In FIG. 3, the additive 20 is introduced into the hardening gas inlet tube 18 which is connected to gas inlet tube 11a of FIG. 2 from the additive container 19. If required, the additive container is put under pressure by adding a cover 19a to the container, and introducing gas under pressure through tube 19b, so that this gas acts to force the additive into the gas inlet tube 18, and there it is mixed with the hardening gas to form a jet 14a composed of the hardening gas and the additive. This additive and hardening gas jet 14a is then caused to mix with the molten resin particles 10 being thrown off under the action of the propeller 7, and the result is that the additive or part of it sticks to the hardening resin to form the particles 15, now consisting of hardened resin and additive that fall to the bottom of the spray hardening vessel 5 in a mixture having a substantially even distribution of both resin and additive.

In the embodiment of the invention shown in FIG. 4, atomization is used to break up the molten resin 2 into small particles immediately after the molten resin comes out of the resin outlet tube 4. Atomization is accomplished by introducing a high velocity gas jet through the atomizing gas inlet tube 17. The impact of the high-velocity gas jet breaks up the molten resin 2 into molten resin particles, which particles are cooled and hardened by the combined action of mixing with the atomizing gas entering the spray hardening vessel 5 through tube 17, and also mixing with the hardening gas jets 14. The hardened resin particles 15 will fall to the bottom of the spray hardening vessel. It should be noted that for certain resins and at relatively slower rates of production, the atomizing gas alone may be sufficient both to disperse the molten resin 2 into molten droplets 10 and to cool and harden the resin 2 into particles 15.

Optionally, in this modification also it is possible to add some other ingredient either solid or liquid to the resin. This is achieved by placing the additive 20 in a reservoir 19 and feeding it through jet 23 into the atomizing gas from inlet tube 17 whereby it is mixed with the resin and dispersed with the resin particles. If required, the additive container is put under pressure by adding a cover 19a to the container and introducing gas under pressure through tube 19b, so that this gas acts to force the additive through jet 23.

The invention is illustrated by the following examples which demonstrate its generality:

EXAMPLE 1

Production of powdered novolac resin

Molten novolac resin (a condensation product of phenol and formaldehyde) kept at a temperature of 115–120° C., was introduced in a steady stream from a heated heactor or storage vessel into the spray-hardening vessel. In the spray-hardener, a propeller, having a diameter of 13 cm., rotated with a speed of about 1500 r.p.m. The angle of the blades of the propeller was about 20°. The stream of the molten resin was directed towards the blades of the propeller about 5 cm. from its center. The molten resin was dispersed by the rotating action of the propeller.

From the bottom of the hardening vessel air was introduced at about 100 l./min. through a gas supply ring. The solidified resin was obtained in the form of small elongated particles together with some small pellets at a rate of about 10 gm./min. The average size of the resin particles was 1.9 mm. in length. Propeller rotational speed was found not to be critical, i.e., at 1300 r.p.m. only slightly longer particles were obtained.

EXAMPLE 2

Production of powdered novolac resin

Working under the same conditions as in Example 1, but using a propeller with the blades at an angle of 45°, the solidified resin was obtained as uniform small pellets with an average diameter of 2.9 mm.

EXAMPLE 3

Production of powdered novolac resin

Working under the same conditions as in Example 1, but using a propeller with the blades at an angle of 70°, the solidified resin was obtained in the form of pellets with an average diameter of 3.6 mm.

EXAMPLE 4

Production of powdered novolac resin

Working under the same conditions as in Example 2, but supplying air at a rate of about 170 l./min., solidified resin of an average size of 1.3 mm. was obtained.

EXAMPLE 5

Production of mixtures of powdered novolac resin with a filler (ground wood)

A molten novolac, at a temperature of about 150° C. and under an air-pressure of 5 p.s.i. in the resin reservoir, was flowing out through a 2 mm. dia. nozzle in a steady stream from the heated storage vessel into the spray hardening vessel in such a way that the flow of the molten resin was directed on to the propeller about 5 cm. from the center. The speed of the propeller was about 1500 r.p.m. and its diameter was 13 cm.

Concurrently with the flowing-in of the molten resin, the filler (ground wood) was blown in sideways into the spray hardening vessel by the hardening air supplied at a rate of about 100 l./min. Thus, a uniform mixture of the novolac resin and the filler was obtained directly in the spray hardening vessel. The ratio resin/filler could be adjusted over a very wide range. Under these conditions, approximately 10 gm./min. net of powdered resin were produced, with the quantity of filler added depending upon the quantity of filler desired in the mix.

Thus we obtained mixtures containing 15–46% filler (wood flour).

EXAMPLE 6

Production of a molding powder

A molten novolac at a temperature of about 130° C. and under an air pressure of about 2 p.s.i. in the resin reservoir was flowing in a steady stream from the heated reservoir into the spray hardening vessel in such a way that the flow of the molten resin was directed onto the propeller about 5 cm. from the center. The speed of the propeller was about 1500 r.p.m., and its diameter was 13 cm.

Concurrently with the flowing-in of the molten resin, a mixture containing 86.2% wood flour, 8.6% hexamethylenetetramine, 3.5% calcium oxide, and 1.7% zinc stearate, was blown into the spray hardening vessel by hardening air supplied at a rate of about 100 l./min. The ratio of the above mentioned mixture to the novolac resin could be adjusted as required. This produced a ready-to-use phenoplastic type of molding powder.

EXAMPLE 7

Production of powered resin

A cumar-resin having a softening point of 90–120° C. was flowing into the spray hardening vessel at a temperature of about 150° C. under an air-pressure of about 0.15 atmosphere in the resin reservoir. Hardening air at a rate of about 100 l./min. was supplied to the hardening vessel. The resin was obtained in the form of a uniform powder.

EXAMPLE 8

Production of powdered rosin

A rosin having a softening point of 130–160° C. was flowing into the spray hardening vessel at a temperature of about 190° C. under an air-pressure of about 0.15 atmosphere in the resin reservoir. Hardening air at a rate of about 100 l./min. was supplied to the hardening vessel. The rosin was obtained as a fine powder at a rate of about 10 gm./min.

EXAMPLE 9

Preparation of small-sized asphalt (bitumen)

Asphalt having a softening point of 120°–130° C. was flowing into the spray hardening vessel at about 190° C. under an air-pressure of about 10 p.s.i. in the resin reservoir. Hardening air at a rate of about 100 l./min. was introduced from the side into the spray-hardener. Solid asphalt was obtained partially in the form of small spheres and partially as fine fibers.

EXAMPLE 10

Preparation of small-sized polyethyleneglycol

Polyethyleneglycol with a softening point of 40–50° C. was flowing into the spray hardening vessel at about 65° C. under an air-pressure of 4–5 p.s.i. in the resin reservoir. Hardening air at a rate of about 100 l./min. was introduced from the side into the spray-hardener. Solid polyethyleneglycol was obtained partially in the form of small lumps and partially as powder.

Although the examples given above for the production of spray hardened resins and mixtures of resins with additives are specific, they are not meant to limit the practice of the processes of production to these examples only.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A process for the production of thermoplastic resin particles, which comprises the steps of
   heating a resin until its viscosity is sufficiently reduced so that the resin flows;
   causing the resin to flow in its reduced viscosity condition into a spray hardening chamber;
   dispersin gthe flowing resin into small particles by subjecting the flowing resin to the mechanical forces produced by contact between the flowing resin and a moving mechanical member;
   subjecting the hot resin particles to a stream of hardening gas having a temperature lower than that of the resin in the spray hardening chamber to form hardened particles of resin; directing the stream of hardening gas across the chamber over the moving mechanical member and across the flow of resin; and
   collecting the resulting hardened resin particles.

2. The process according to claim 1 in which the moving mechanical member is a rotating member.

3. The process according to claim 2, wherein the hardening gas blows parallel to the plane of rotation of the rotating member.

4. The process according to claim 1 which additionally comprises
   introducing into the spray hardening chamber concurrently with the stream of relatively cool hardening gas a stream of gas carrying an additive material;
   mixing the hot resin particles with the additive carried by the hardening gas; and collecting the resulting hardened resin-additive mixture.

5. The process according to claim 4 wherein the additive is introduced into the spray hardening chamber substantially at the location at which the hot flowing resin is being dispersed.

6. A process for the production of thermoplastic resin particles, which comprises the steps of
heating a resin until its viscosity is sufficiently reduced so that the resin flows;
causing the resin to flow in its reduced viscosity condition into a spray hardening chamber;
dispersing the flowing resin by subjecting it to the forces produced by contact between the flowing resin and a high velocity gas stream which flows across the flowing resin and atomizes the flowing resin;
subjecting the hot resin particles to a stream of hardening gas having a temperature lower than that of the resin in the spray hardening chamber to form hardened particles of resin; and
collecting the resulting hardened resin particles.

7. The process according to claim 6 wherein the resin is atomized and hardened by the high velocity gas stream.

References Cited

UNITED STATES PATENTS

| 1,294,909 | 2/1919  | Howell   | 264—8  |
| 1,798,166 | 3/1931  | Mensing  | 264—13 |
| 1,938,876 | 12/1933 | Takata   | 264—8  |
| 2,673,121 | 3/1954  | Brennan  | 264—12 |
| 2,356,599 | 8/1944  | Landgraf | 264—8  |

ROBERT F. WHITE, Primary Examiner

J. R. HALL, Assistant Examiner

U.S. Cl. X.R.

264—12, 13